United States Patent Office 3,498,420
Patented Mar. 3, 1970

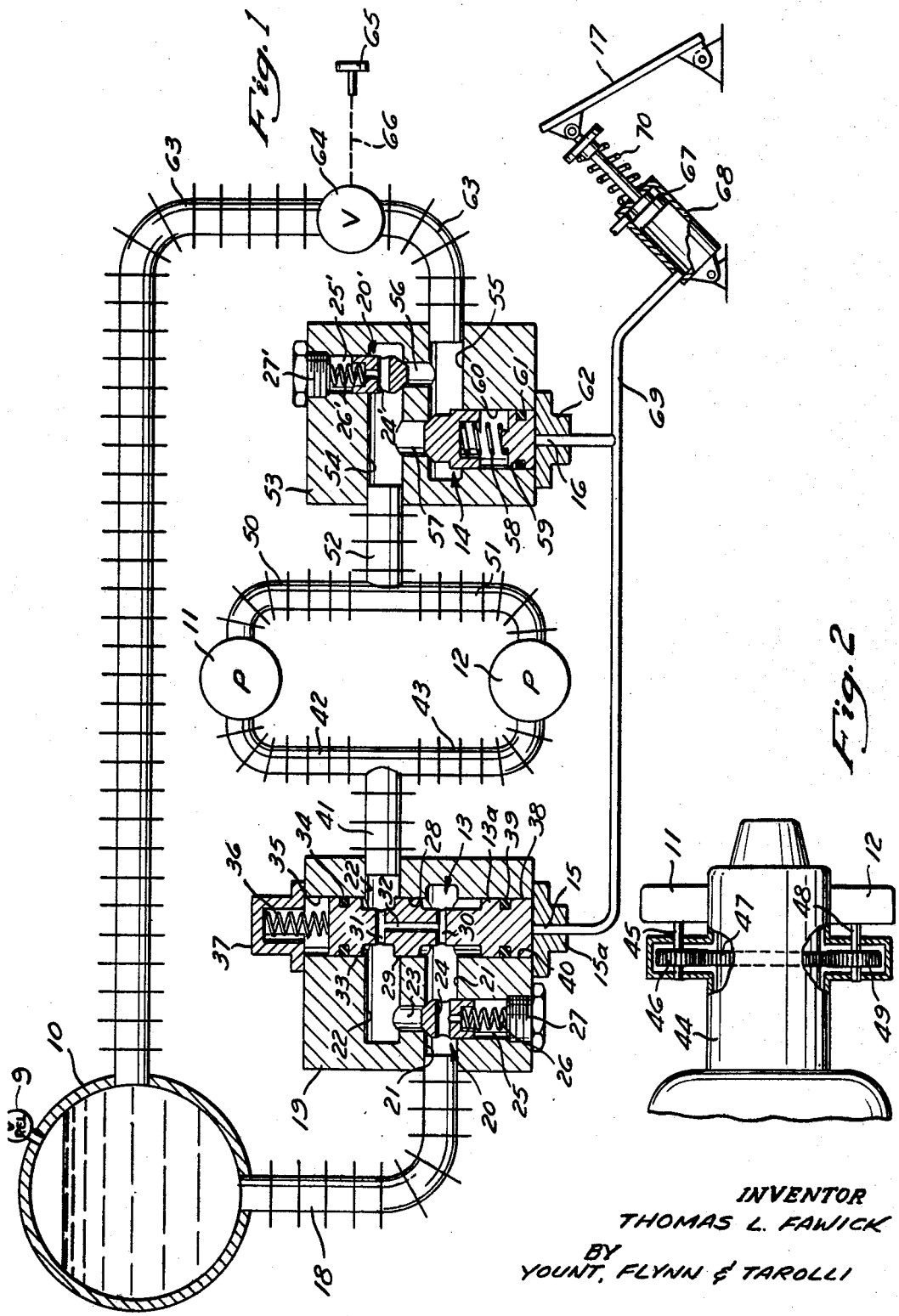

3,498,420
HYDRAULIC BRAKING SYSTEM
Thomas L. Fawick, Shaker Heights, Ohio
(Hotel Statler Hilton, Cleveland, Ohio 44101)
Filed Feb. 7, 1968, Ser. No. 703,778
Int. Cl. F16d 57/06
U.S. Cl. 188—90          2 Claims

ABSTRACT OF THE DISCLOSURE

The present vehicle braking system has two gear pumps, one on each side of the transmission, which are driven by a continuously running gear in the transmission. Normally, a limited flow of hydraulic liquid is continuously circulated by the pumps to and from a reservoir which is under air pressure. When the vehicle brake is applied, first a flow-limiting valve at the inlet side of the pumps is opened fully and then a valve at the outlet side of the pumps is actuated to restrict the outlet flow and thereby provide a braking load on the engine.

---

This invention relates to a supplementary braking system for vehicles, particularly heavy automotive vehicles, such as trucks.

Various systems have been proposed heretofore for using gear pumps as supplementary brakes or engine retarders on automotive vehicles by restricting the outlet flow from the pump when the brake pedal is applied, so that the pump system acts as a braking load on the engine. The present invention is directed to a system of this general type which overcomes the practical deficiencies of the previously-proposed arrangements by providing a limited flow of hydraulic liquid through the pump during normal, non-braking operation of the vehicle, enough to prevent the pump from overheating, but not enough to cause the pump to act as a substantial load on the vehicle engine until the brake pedal is actuated. The present invention also prevents overheating of the pump, when the vehicle is braked, by first fully opening the inlet flow into the pump and then restricting the outlet flow from the pump to provide the braking load on the vehicle engine.

Accordingly, it is an object of this invention to provide a novel and improved vehicle braking system which employs one or more engine-driven pumps whose output flow is restricted to provide a braking load on the vehicle engine in response to a braking operation by the driver of the vehicle.

Another object of this invention is to provide such a braking system in which the hydraulic liquid is maintained under gaseous pressure, such as air pressure, during normal, non-braking operation of the vehicle and is circulated in a limited flow continuously through the pump.

Another object of this invention is to provide such a system in which a braking operation by the operator of the vehicle first opens a flow-limiting valve at the inlet side of the pump and then actuates a valve at the outlet side of the pump to restrict the pump outlet flow and thereby provide a braking load on the vehicle engine.

Further objects and advantages of this invention will be apparent from the following detailed description of a presently-preferred embodiment thereof, which is illustrated in the accompanying drawing.

In the drawing:

FIGURE 1 is a schematic view illustrating the present system, with certain parts broken away for clarity;

FIGURE 2 is a fragmentary elevational view showing two pumps in the present system located on opposite sides of the vehicle transmission and driven by a continuously running gear in the transmission.

Referring to FIG. 1, in general outline the present system comprises a pressurized reservoir 10 for hydraulic liquid, a pair of gear pumps 11 and 12 driven from the vehicle engine, an inlet valve 13 in the inlet line connecting the reservoir to the pump inlets, an outlet valve 14 in the outlet line connecting the pump outlets back to the reservoir, and pressure inlets 15 and 16 to the inlet valve 13 and the outlet valve 14, respectively, for controlling their operation in response to a braking action by the driver of the vehicle, such as depressing the brake pedal 17.

In accordance with one feature of the present invention, the hydraulic liquid in the reservoir 10 is maintained under gaseous pressure, such as by maintaining suitable air pressure above the liquid level within the reservoir. This pressure insures a continuous circulation of hydraulic liquid from the reservoir 10 through the inlet valve 13, the pumps 11 and 12, and the outlet valve 14 back to the reservoir while the vehicle engine is running and the brake pedal 17 is not depressed. A relief valve 9 limits the air pressure in reservoir 10.

A pipe or tube 18 extends down from the bottom of the reservoir to a casing or housing 19 which contains the inlet valve 13 and also a check valve 20. The casing 19 has a pair of parallel longitudinal bores 21 and 22 and a connecting cross passage 23 between them which is normally closed by the check valve 20.

The check valve 20 has a generally T-shaped passage 24, the upper branch of which provides for the flow of hydraulic liquid through this valve along passage 21 and the downwardly-extending branch of which leads to a chamber 25 in which the bias spring 26 for this valve is located. The lower end of chamber 25 is closed by a plug 27 threadedly mounted on the casing, and the spring 26 is under compression between this plug and valve 20, urging the tapered upper end of valve 20 into sealing engagement with the lower end of the cross passage 23. The valve 20 has a sufficient clearance in passage 21 that this clearance, together with the passageway provided by the upper branch of passage 24 through valve 20, insures a relatively unrestricted flow of hydraulic liquid from left to right in passage 21 past valve 20. That is, the valve 20 does not significantly restrict the flow along passage 21.

The valve casing 19 has another cross passage 28 connecting its longitudinal bores 21 and 22. This second cross passage 28 is normally sealingly engaged by a cylindrical central land 29 on the valve spool 13a of the inlet valve 13. Valve 13a has a restricted bypass passage with a lower branch 30 communicating with the lower bore 21 in the valve casing, an upper branch 31 communicating with the upper bore 22, and a connecting branch 32 which extends between the lower and upper branches 30 and 31. This passage 30–32 in the valve spool 13a provides a restricted inlet flow passage to the pumps 11 and 12 between the casing bores 21 and 22 in the normal position of the valve spool 13a, as shown in FIG. 1.

At its upper end in FIG. 1, the valve spool 13a presents a cyclindrical land 33 carrying an O-ring 34 of rubber or the like which sealingly engages the wall of a cross bore 35 in th valve casing 19 above the upper longitudinal bore 22 therein and concentric with the cross passage 28. A very light coil spring 36 is engaged under very slight compression between the upper end of the valve spool 13a and a top end cap 37 on the casing 19. This coil spring 36 biases the valve spool 13a to the position shown in FIG. 1.

At its lower end in FIG. 1, the valve spool 13a has a cylindrical land 38 carrying an O-ring 39 which sealingly engages the wall of a lower cross bore 40 in the casing 19 extending down from the longitudinal bore 21 in the latter. The aforementioned pressure inlet 15 is provided by a fitting 15a attached to the casing 19 at the lower end of this bore 40. Fluid under pressure at this inlet 15 can force the valve spool 13a upward until its middle land 29 is completely disengaged from the cross passage 28 and the valve spool is positioned to permit maximum flow from longitudinal bore 21 to bore 22, and from there to the inlets of the respective pumps 11 and 12.

The right end of bore 22 in the valve casing 19 is connected to a pipe 41 leading to a pair of branch pipes 42, 43 which lead respectively to the inlet sides of pumps 11 and 12. Each of these pumps preferably is a gear pump. As shown in FIG. 2, these pumps are located on diametrically opposite sides of the casing 44 of a transmission which is driven from the vehicle engine. The drive shaft 45 of pump 11 has a splined connection to a pinion 46 which meshes with a continuously rotating gear 47 in the transmission. The drive shaft 48 of pump 12 has a splined connection to a pinion 49 which meshes with gear 47 at a location diametrically opposite the pinion 46 for pump 11.

The outlet sides of pumps 11 and 12 are connected through respective branch pipes 50 and 51 to a pipe 52 leading into a casing 53 which contains the outlet valve 14 and a check valve 20', also. Casing 53 has a pair of parallel longitudinal bores 54 and 55 and a connecting cross passage 56 between them which is normally closed by the check valve 20'.

Check valve 20' is essentially identical to the previously-described check valve 20 at the inlet side of the pumps, and the detailed description will not be repeated. Corresponding elements of check valve 20' are given the same reference numerals as those of check valve 20, but with a "prime" suffix added.

A second cross passage 57 connects the longitudinal bores 54 and 55 in casing 53, and the inlet valve 14 is located at this cross passage. As shown in FIG. 1, valve 14 is a poppet valve having a frusto-conical upper end for sealing engagement with the lower end of the cross passage 57. A coil spring 58 is engaged under compression between valve 14 and a piston 59, which is slidably mounted in a bore 60 extending down from the lower longitudinal bore 55 in casing 53. Piston 59 carries an O-ring 61 which sealingly engages the wall of bore 60. A lower end cap or fitting 62 attached to casing 53 provides the aforementioned pressure inlet 16.

In the absence of any output flow from the pumps, the spring 58 will position the outlet valve poppet 14 and the piston 59 as shown in FIG. 1, with valve poppet 14 closing the lower end of the cross passage 57 and with piston 59 seated against the fitting 62. However, the force exerted by spring 58 is sufficiently small that a relatively small output flow from the pumps will unseat the outlet valve 14 to pass this flow into the lower longitudinal bore 55 in casing 53. When pressurized fluid is introduced at the pressure inlet 16, the piston 59 moves upward to increase the compression of spring 58 so that it exerts a greater closing force against valve 14, tending to position the latter upwardly to restrict the flow through the cross passage 57.

The right end of the lower bore 55 is connected to an outlet pipe 63 which leads back to the reservoir 10 below the liquid level therein, but substantially above the connection of pipe 18.

Preferably, a normally-open, manually-operated valve 64 is connected in line 63. This valve is connected to the parking brake handle 65 on the vehicle, as indicated schematically by the dashed line connection 66, so that when this handle is actuated by the vehicle operator to engage the parking brake it also moves valve 64 to its fully closed position to completely block the outlet sides of the pumps 11 and 12.

The usual brake pedal 17 on the vehicle is suitably coupled to a piston 67 which is slidable in a fixed cylinder 68. When the brake pedal is depressed by the vehicle operator to apply the vehicle brakes through the conventional braking system on the vehicle, it forces piston 67 downward along cylinder 68 to exert hydraulic pressure through a line 69 connected to both the pressure inlet 15 for the inlet valve 13 and the pressure inlet 16 for the outlet valve 14. The hydraulic liquid in this line forces the inlet valve spool 13a upward and forces the outlet valve piston 59 upward in response to the depression of brake pedal 17. When the vehicle operator releases the brake pedal, a spring 70 returns the brake pedal and piston 67 to their normal positions, as shown in FIG. 1, so as to relieve the pressure on the inlet valve spool 13a and the outlet valve piston 59.

Preferably, the pipes 18, 41, 42, 43, 50, 51, 52 and 63 are provided with heat-radiating fins to dissipate the heat developed by the hydraulic liquid.

In the operation of the present system, while the vehicle engine is running, the pumps 11 and 12 will be driven continuously from the vehicle engine through the transmission gear 47. If neither the brake pedal 17 nor the parking brake handle 65 is actuated, the inlet valve spool 13a will assume the position shown in FIG. 1, in which its passage 30, 32, 31 provides a limited flow of hydraulic liquid into the pumps. The output pressure developed by the pumps will be sufficient to open the outlet valve 14 to pass the hydraulic liquid back to the reservoir. The outlet valve 14 provides a very slight load on the pumps, so that the pumps themselves do not significantly load the vehicle engine. Continuous circulation of this limited flow of hydraulic liquid through the pump is assured by the air pressure in the top of reservoir 10, above the hydraulic liquid level therein.

When the brake pedal 17 is depressed, the resulting pressure at the pressure port 15 of inlet valve 13 moves the inlet poppet valve 13a immediately upward to its fully open position to permit an increased inlet flow of hydraulic liquid into the pumps. This opening of the inlet valve 13 takes place before the outlet valve 14 is moved to a flow-restricting position because the inlet spring 36 for valve 13 is extremely light. After the inlet valve 13 opens, the hydraulic pressure at the pressure inlet 16 of the outlet valve 14 moves piston 59 upward to increase the compression of spring 58, which now urges the outlet valve poppet 14 upward to a position in which it restricts the pump outlet flow in proportion to the depression of the brake pedal 17. Because the pumps 11 and 12 are operating against increased output pressure because of this flow restriction, the pumps exert a greater load on the engine, tending to brake it to a stop.

Usually the parking brake handle 65 will be actuated only when the vehicle is at rest. When the driver does this, he closes valve 64 to completely block the outlet line 63, thereby causing the pumps to brake the engine if the driver attempts to start the vehicle moving while the parking brake is engaged.

The foregoing description indicates the operation of the present system while the vehicle is moving forward. If the vehicle is being backed up, the direction of the pumps 11 and 12 is reversed. In that event, the check valve 20' at what is now the inlet side of the pumps will open and the check valve 20 at what is now the outlet side of the pumps will open, also. Until the brake pedal 17 is depressed, the valve spool 13a will be in the position shown in FIG. 1, and the upper branch 31 of its passage (which leads to the check valve 20) will provide a flow restriction for limiting the flow through the pumps. Consequently, there is a limited continuous flow through the pumps while the vehicle is backing up and this flow is sufficient to prevent the pumps from overheating at this time.

While a presently-preferred embodiment of this system has been described in detail with reference to the accompanying drawing, it is to be understood that various modifications, omissions and adaptations which depart from

I claim:
1. A supplementary braking system for an engine-driven vehicle having an operator-controlled braking system comprising:
- a reservoir containing hydraulic liquid under gaseous pressure;
- pump means driven from the vehicle engine;
- an inlet line extending between said reservoir and the side of said pump means which is the inlet side when the vehicle direction is forward;
- an outlet line extending between said reservoir and the opposite side of said pump means;
- a normally-closed inlet valve in said inlet line which, when closed, provides a flow-restricting bypass passage therein for normally passing a limited flow of pressurized hydraulic fluid from the reservoir to said first-mentioned side of said pump means;
- an outlet valve in said outlet line which is normally opened by the limited outlet flow from said pump means to return the hydraulic liquid to the reservoir;
- and operator-controlled means for opening said inlet valve and thereafter actuating said outlet valve to restrict the pump outlet flow to provide a braking load on the vehicle engine;
- said outlet valve having a movable outlet valve member in said outlet line, spring means biasing said outlet valve member to a position blocking said outlet line, said spring means being overcome by said limited outlet flow from said pump means, and a movable pressure-responsive member engaging said spring means;
- said means for actuating said outlet valve to restrict the pump outlet flow comprising means controlled by the vehicle operator for applying fluid pressure against said pressure-responsive member to move the latter to a position increasing the force of said spring means against said outlet valve member.

2. A suplementary braking system for an engine-driven vehicle having an operator-controlled braking system comprising:
- a reservoir containing hydraulic liquid under gaseous pressure;
- pump means driven from the vehicle engine;
- an inlet line extending between said reservoir and the side of said pump means which is the inlet side when the vehicle direction is forward;
- an outlet line extending between said reservoir and the opposite side of said pump means;
- a normally-closed inlet valve in said inlet line, said inlet valve including a movable valve member and spring means biasing said inlet valve member to a position blocking the inlet line, said movable inlet valve member having a flow-restricting bypass passage therein for normally passing a limited flow of pressurized hydraulic liquid from the reservoir to said first-mentioned side of said pump means when said inlet valve is closed;
- an outlet valve in said outlet line which is normally opened by the limited outlet flow from said pump means to return the hydraulic liquid to the reservoir;
- and operator-controlled means for opening said inlet valve and thereafter actuating said outlet valve to restrict the pump outlet flow to provide a braking load on the vehicle engine;
- said outlet valve having a movable outlet valve member, spring means biasing said outlet valve member to a position blocking said outlet line, said spring means in the outlet valve being overcome by said limited outlet flow from said pump means, and a movable pressure-responsive member engaging said spring means in the outlet valve;
- said operator-controlled means for opening the inlet valve and thereafter actuating said outlet valve to restrict the pump outlet flow comprising means controlled by the vehicle operator for applying fluid pressure against said movable inlet valve member and against said pressure-responsive member in the outlet valve to first displace said movable inlet valve member to a position in which it unblocks said inlet line and thereafter to displace said pressure-responsive member in the outlet valve to a position increasing the force of said spring means in the outlet valve against said movable outlet valve member.

References Cited

UNITED STATES PATENTS

| | | | |
|---|---|---|---|
| 3,283,859 | 11/1966 | Bertram et al. | 188—90 |
| 1,679,085 | 7/1928 | Hull | 188—92 |
| 1,710,032 | 4/1929 | Price | 188—92 |
| 2,035,387 | 3/1936 | Heritier | 188—91 |
| 2,152,570 | 3/1939 | Scates | 188—92 |

GEORGE E. A. HALVOSA, Primary Examiner

U.S. Cl. X.R.

188—92